United States Patent [19]

Remillard

[11] Patent Number: 5,570,455

[45] Date of Patent: Oct. 29, 1996

[54] METHOD AND APPARATUS FOR ENCODING SEQUENCES OF DATA

[75] Inventor: John F. Remillard, Chicago, Ill.

[73] Assignee: Philosophers' Stone LLC, Cheyenne, Wyo.

[21] Appl. No.: 5,734

[22] Filed: Jan. 19, 1993

[51] Int. Cl.⁶ .................................................. G10L 5/06
[52] U.S. Cl. ............................................ 395/259; 395/2.1
[58] Field of Search ............................. 395/2, 2.39, 2.31, 395/2.1, 2.2, 2.59, 2.4; 381/36–40; 389/29–40

[56] References Cited

U.S. PATENT DOCUMENTS 4,382,160   5/1983   Gosling et al. ........................... 395/2.2

OTHER PUBLICATIONS

Efficient VLSI Digital Logarithmic CODECS Hoefflinger IEEE, Jun. 1991.
Digital Logarithmic CMOS Multiplier For Very High Speed Signal Processing Hoefflinger et al. IEEE/May 1991.
Multiplier Policies For Digital Signal Processing Ma et al. IEEE Jan. 1990.
High quality 16 KB/S Speech Coding With A One–Way Delay Less Than 2MS Chen IEEE/Apr. 1990.

*Primary Examiner*—Allen R. MacDonald
*Assistant Examiner*—Richemond Dorvil
*Attorney, Agent, or Firm*—Townsend and Townsend and Crew

[57] ABSTRACT

A method and apparatus for encoding a sequence of plural-bit data points as a single plural-bit number representing the original sequence. An analog signal is represented by a series of these single plural-bit numbers. The series can then be used for pattern matching in speech recognition.

10 Claims, 5 Drawing Sheets

METHOD AND APPARATUS FOR ENCODING SEQUENCES OF DATA

BACKGROUND OF THE INVENTION

1. Technical Field

The present invention pertains to methods and apparatus encoding long sequences or strings of data in order to simplify data storage, processing and/or transmission. More particularly, the invention relates to encoding techniques for significantly reducing the amount of speech data that must be stored, processed and/or transmitted without loss of information contained in the original data sequence. The has particular utilization in speech recognition and compression systems.

2. Discussion of the Prior Art

U.S. Pat. No. 3,940,565 (Lindenberg) discloses an example of numerous prior art speech recognition systems wherein the speech signal is infinitely clipped and the patterns of zero crossings are utilized to identify speech characteristics in the signal. This technique has also been utilized in speech compression systems to reduce the amount of data required to be transmitted without impairing the quality of the reproduced speech at the receiving end of the transmission medium. An example of such a speech compression system may be found in U.S. Pat. No. 3,684,829 (Patterson). In U.S. Pat. No. 4,382,160 (Gosling et al) there is disclosed another speech compression system wherein the patterns of zero crossings and other waveform events, such as amplitude maximum and minimum peaks, are utilized to enhance intelligibility in the reproduced speech signal.

In utilizing waveform event patterns to encode speech signals, very long sequences of data points are required to achieve accurate recognition of the speech contained in the signal. The interminably long strings of data points make processing and storage quite unwieldy and time-consuming, not to mention that an inordinate storage capacity is required. With this problem at hand, the present invention has been derived to provide a technique for encoding the data necessary to identify speech in a speech signal in a way that reduces the amount of data required to be stored, processed and/or transmitted to accurately perform speech recognition and transmission functions.

OBJECTS AND SUMMARY OF THE INVENTION

It is an object of the present invention to provide a method and apparatus for encoding sequences of data in a manner that preserves the order and composition of the data while significantly reducing storage and processing requirements.

It is another object of the present invention to provide a method and apparatus for encoding a sequence of plural-bit data points as a single plural-bit number uniquely representing the original sequence without loss of order or composition. A further object of the invention is to provide a method and apparatus for deriving a multiplicity of such plural-bit numbers, each uniquely representing a respective sub-sequence in an overall longer sequence of data points, to thereby encode and uniquely identify the longer sequence.

In accordance with the present invention, a data sequence of n data points $B_1, B_2, B_3, \ldots$ is enclosed by first providing a sequence of n corresponding sums, wherein each sum, $S_i$, is the sum of its corresponding data point $B_i$ plus all preceding data points in the original data sequence. Stated otherwise, $S_i = B_1 + B_2 + \ldots B_i$. The logarithms of these sums are then added in the same manner to provide a corresponding sequence of n logarithm sums, wherein each logarithm sum $LS_i$ is the sum of the logarithms of its corresponding sum $S_i$ and all preceding sums in the sum sequence. Stated otherwise, $$LS_i = \log S_1 + \log S_2 + \ldots \log S_i.$$

Finally, the average A of the logarithm sums is taken over q, wherein q is arbitrary but smaller than n and its choice may have relevance to the data processing function performed. Stated otherwise, $$A = (LS_1 + LS_2 + \ldots LS_q)/q.$$

The result of the foregoing is a number A uniquely representing the order and composition of the original sequence of data points. As a data processing tool, the foregoing technique is extremely powerful in that it permits a reduction, to virtually any desired level, of the data required to be stored and processed while still representing the original data sequence. In this regard, a long sequence of data can be broken down into successive smaller sequences, and each smaller sequence can be encoded as described above. The smaller sequences can overlap or not, depending upon the nature of the system and the processing functions to be performed. In any event, the resulting averages A may be further encoded as though they were themselves data points in a sequence to provide a second order code with further data reduction. Third order and greater order encoding may similarly be employed.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DESCRIPTION OF THE PREFERRED EMBODIMENTS

In accordance with the present invention, any string or sequence of data points $B_1, B_2, B_3, \ldots B_n$, can be uniquely encoded by processing the data points in the following manner. First, for each data point $B_i$ in the sequence, a sum $S_i$ is provided of that data point $B_i$ plus all other data points preceding $B_i$ in the data sequence. Thus, for a sequence of n data points, the sums are represented as follows $$S_1 = B_1;\ S_2 = B_1 + B_2;\ S_3 = B_1 + B_2 + B_3;\ S_n = B_1 + B_2 + \ldots B_n.$$

The logarithm (either natural, base ten, or any other base) is computed for each sum $S_i$. Then, for each sum $S_i$ in the sum sequence, a sum is provided of the logarithm of that sum plus the logarithms of all other preceding sums in the sum sequence. Thus, for n sums, the sums of logarithms are represented as follows:

$LS_1 \log S_1; LS_2 = \log S_1 + \log S_2; LS_3 = \log S_1 + \log S_2 + \log s_3; \log S_n = \log S_1 + \log S_2 + \ldots \log S_n.$ An average value A of the sequence of logarithm sums is then obtained for q data points. Specifically, q logarithm sums are themselves summed and the result is divided by q, where q is an arbitrary number that may or may not have significance in the data processing function to be performed with the encoded data. The resulting average A may be represented by $A = (LS_1 + LS_2 + LS_3 + \ldots LS_n)/q.$ The value of A uniquely represents the order and composition of the data sequence $B_1, B_2, \ldots B_n$. Accordingly, only the multi-bit number A need be stored, not each of the n multi-bit data points. For example, if a pattern to be recognized in a signal is made up of a sequence of multiple data points, the data points can be processed in the manner described to yield a encoded average A for the incoming data. This encoded average A can then be compared to different stored reference or standardized averages to determine or identify the pattern appearing in the incoming data sequence.

It will be appreciated that the described encoding technique of the present invention significantly reduces the amount of data that must be stored to serve as models for comparisons with incoming data. The technique is particularly useful.

Typically, an overall pattern to be recognized in an input data sequence will have numerous characteristics. Each characteristic, or part thereof, is identifiable by the order and composition of sequential data points. Therefore, the overall pattern, according to the present invention, would typically be represented by multiple coded non-linear averages $A_1, A_2, A_3, \ldots A_m$, wherein each such coded average $A_i$ uniquely represents a sequence of data points. It is also possible, and in many cases desirable, to encode successive averages $A_i$ by considering overlapping sequences of data points $B_i$. For example, $A_1$ may be encoded from data points $B_1$ through $B_n$; $A_2$ may be encoded from data points $B_2$ through $B_{n+1}$; etc. The overlap in this case includes n−1 common data points. However, it is possible to have less overlap, or no overlap at all. Likewise, the number n of data points in each sequence represented by an average value $A_i$ need not be the same.

It should be noted that the encoding process of the present invention can be repeated on the averages $A_i$ to further reduce the amount of data to be stored. In other words, the same procedure described above for processing the individual data points $B_i$ can be repeated using the coded averages $A_i$ instead, to thereby arrive at second order encoded averages. The second order coded averages can likewise be further encoded to achieve third or greater order codes. With each encoding the amount of data to be stored, without loss of the order and composition of the original data points, is significantly reduced.

The encoding technique described above employs sums of logarithms. Since the result of summing logarithms is equivalent to the logarithm of the multiplication product of the original two numbers, it is within the scope of the present invention to multiply the values of the data points and then take the logarithm of the resulting product in order to obtain the values $LS_1$, $LS_2$, etc., described above.

In utilizing the encoding technique of the present invention in a speech recognition system, multiple coded averages $A_i$, each corresponding to a sequence of coded data points, are stored to represent a standard for a particular phoneme against which incoming data is compared. The incoming data is first encoded in the manner described so that the resulting averages can be compared to the stored averages. If the result of the comparison is a match, a phoneme is recognized in the input signal.

Figure 1:
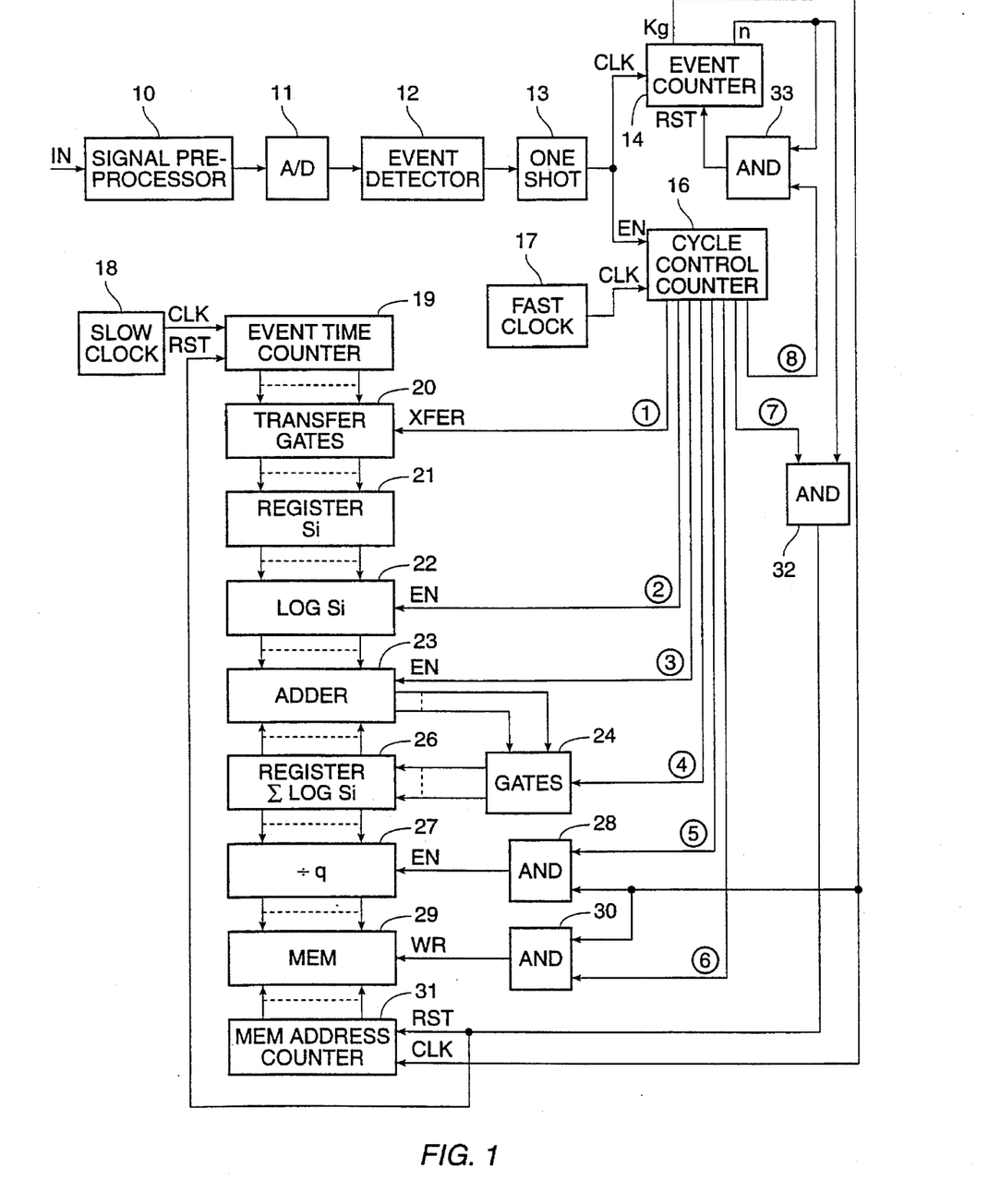
FIG. 1 is a block diagram of a system for performing the encoding techniques of the present invention.

Referring now specifically to FIG. 1 of the accompanying drawings, a system for utilizing the above-described techniques for encoding and storing a data sequence of multi-bit data points includes a signal pre-processor 10 containing conventional circuitry and adapted to receive an analog signal and prepare it for subsequent processing. The analog input signal may, for example, be an audio speech signal received from an amplifier (not shown) coupled to a microphone (not shown). The following discussion assumes that the system illustrated in FIG. 1 is used in connection with a speech recognition system; however, it will be understood that the encoding technique described is applicable to other systems wherein long sequences of data are stored, processed and/or transmitted. In the pre-processor circuit 10 the audio signal is typically bandpass filtered and subjected to substantially constant volume amplification whereby small but significant fluctuations are amplified to a suitable level to be accommodated by subsequent circuits. Constant volume amplification is necessary, for example, when the input signal has a wide dynamic range. In pre-processor 10 the input signal may also be differentiated or integrated, depending upon noise conditions; that is, low frequency noise is reduced by differentiation, high frequency noise is reduced by integration. A d.c. signal may be superimposed on the input signal in the pre-processor in order to eliminate the zero crossings occurring when noise appears during intervals of silence in the input signal. Finally, pre-processor 10 may perform one or more other known techniques on the input signal, such as syllabic companding, spectral shaping, frequency shifting, spectral inversion, etc.

The output signal from pre-processor 10 is passed to an analog to digital (A/D) converter 11 which may, for example, be a conventional pulse code modulation encoder sampling amplitude levels of the preprocessed signal at a prescribed sampling frequency. For a speech signal having a bandwidth on the order of 3 Khz, the sampling frequency would be on the order of 20 Khz. Each amplitude sample is a multi-bit number.

An event detector 12 receives the sequential amplitude samples from A/D converter 11, senses the occurrence of one or more predetermined events in the input signal amplitude, and provides an output pulse upon detection of each such event. Event detector 12 may be, for example, a conventional zero crossing detector providing an output pulse each time the input signal amplitude changes polarity. Alternatively, and in the preferred embodiment of the present invention, the event detector senses both zero crossings and all amplitude maximum and minimum points, and provides an output pulse upon occurrence of each. Amplitude maximum and minimum points are amplitude peaks (positive or negative) corresponding to a zero value for the derivative of the input signal amplitude. Zero values for second, third and higher order derivatives may also be employed as waveform events. Zero crossing and peak detection circuits are conventional and well known in the art.

Each output pulse from event detector 12 triggers a one-shot multi-vibrator 13 to provide a shaped output pulse, contemporaneously with each detected event, to serve as a clock pulse for an event counter 14 and as an enable pulse for a cycle control counter 16. Event counter 14 counts and accumulates detected events until it is reset after n events in the manner described below. Cycle control counter 16, when enabled by a detected event, counts high frequency clock pulses continuously provided by a fast clock pulse generator 17. The purpose of the cycle control counter 16 and its fast clock 17 is to provide a sequence of timing signals, between successive detected events, to initiate various control functions. In the illustrated example, eight timing signals, numbered 1 through 8, respectively, are provided. The width of the enable pulse received from one-shot multi-vibrator 13 is sufficient to permit the entire sequence of eight timing signals to be generated in response to fast clock 17 during the enable pulse width interval. Counter 16 is reset by the trailing edge of the enable pulse.

A slow clock pulse generator 18 continuously provides a string of clock pulses counted by an event time counter 19. The function of counter 19 is to keep a running measure of time elapsed between the first and nth detected events in a data sequence. The clock pulses from slow clock 18 have a slower repetition rate than the clock pulses from fast clock 17 in order to permit the entire cycle of timing functions, as controlled by cycle control counter 16, to be performed between successive counts at event time counter 19. In other words, all eight timing pulses from counter 16 are generated between successive counts at counter 19. On the other hand, the repetition rate of the slow clock 18 determines the time measuring resolution at counter 19 and should not be too slow. Typically, the repetition rate for the fast clock may be on the order of or greater than 50 Mhz, while the slow clock repetition rate is under 1 Mhz.

The current count in event time counter 19 appears in transfer gates 20 which selectively transfer that current count to a register 21 in response to a received transfer pulse. The transfer pulse corresponds to the first timing pulse 1 in the control timing cycle generated by cycle control counter 16 during the timing cycle between detected events. It will be appreciated that the number transferred to register 21 in the ith timing cycle (i.e., at the time of detection of the ith event in the sequence of n detected events), is an accumulation of counts $B_1 + B_2 + \ldots B_i$ from the time of the first detected event in the sequence. Thus, using the notations employed in the previous discussions, the timer count transferred to register 21 during the ith event cycle is $S_i$, that is, the sum of the times between detected events to that point in the data sequence.

A logarithm circuit 22 responds to the second timing pulse 2 from counter 16 to compute the logarithm of the number in register 21 and apply it as one multiple bit input signal to an adder 23. Adder 23 is enabled by control cycle timing pulse 3 to sum both of its input signals. The output signal from adder 23 is applied via selectively actuable transfer gates 24 to a register 26 under the control of cycle timing pulse 4. The multiple-bit signal in register 26 is connected as the second input signal to adder 23. Accordingly, in response to cycle timing pulse 3, adder 23 adds $\log_i$ to the number in register 26 (i.e., $LS_{i-1}$) to achieve the result $LS_i$. The next timing pulse 4 causes this addition result $LS_i$ to be transferred to register 26 to replace the previous number stored therein.

The multiple bit number in register 26 is also applied to a divider circuit 27 connected to be periodically enabled by a signal from AND 28 to divide the said number by q. AND gate 28 receives two input signals. The first input signal is a cycle timing pulse 5; the second is a pulse from event counter 14 provided in response to every qth detected event. It will be appreciated, therefore, that AND gate 28 is not enabled during every event timing cycle; rather, it is enabled only during each qth cycle. Divider 27, accordingly, takes the average A of the accumulated log sums $LS_q$ after every q detected event.

A memory 29, serving to store each value of A derived at divider 27, has its data input terminals connected to receive the division result A from the divider. A write signal WR is applied to memory 29 from an AND gate 30. Memory locations at memory 29 are selectively addressed by a write memory address counter 21. AND gate 30 is enabled by timing cycle pulse 6 after every qth event is detected and counted by event counter 14. Accordingly, during each cycle wherein divider 27 derives an average A, AND gate 30 thereafter develops a write pulse to enter that average in the addressed location of memory 31. Memory address counter 31 counts every qth detected event counted at event counter 14, and the averages A are stored at sequential locations in memory 29.

In the embodiment illustrated in FIG. 1, when n counts are accumulated at event counter 14, two AND gates 31, 33 are primed. During the immediately following timing cycle, timing pulse 7 enables AND gate 32 to reset event time counter 19 and memory address counter 31. During that same timing cycle, timing pulse 8 enables AND gate 33 to reset event counter 14. The system is then ready to repeat another n-event sequence. In each such sequence, plural averages A are computed and stored in memory 29 upon detection of every qth event in the input signal.

Figure 2:
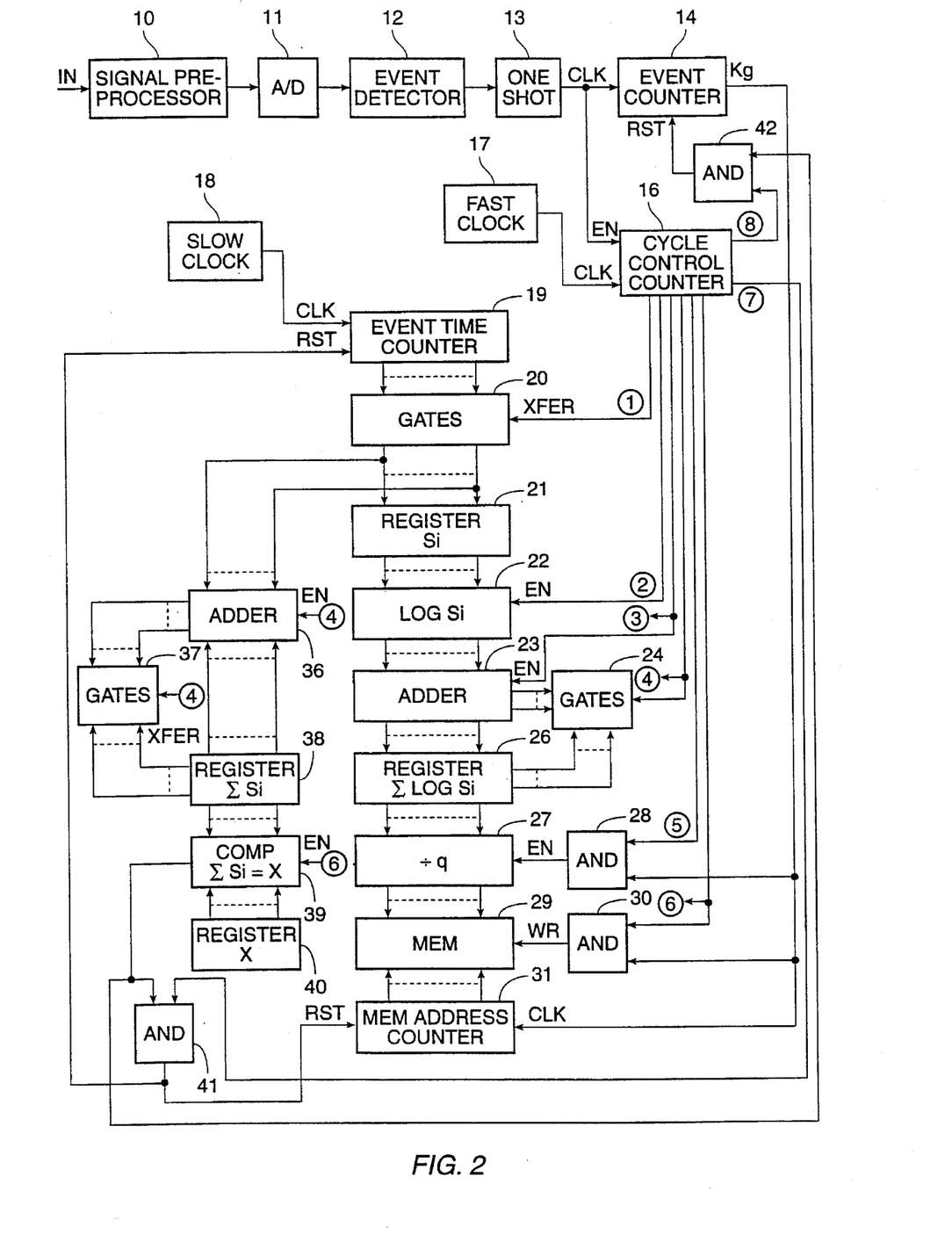
FIG. 2 is a block diagram of an alternative embodiment of a system for performing the coding techniques of the present invention.

It will be appreciated that the system described above utilizes a number n of detected events to determine the duration of each data sequence. It may be desirable or required in some systems to instead determine data sequence duration by predetermined time intervals. A system for doing that is illustrated in FIG. 1 to which specific reference is now made. In that system there are many components identical to the components in the system illustrated in FIG. 1, and all such like components bear the same reference numerals. To avoid repetition, discussion of those like components is omitted and only the components unique to the system of FIG. 2 are described.

The multiple-bit number $S_i$ provided by register 21 is applied to an adder 36 in addition to being applied to logarithm circuit 22. The multiple-bit output signal from adder 36 is applied via transfer gates 37 as an input signal to a register 38. The signal in register 38 is applied as a second input signal to adder 36. Cycle timing pulse 3 serves as an enable signal to actuate the adder; timing pulse 4 actuates transfer gates 37. Accordingly, the value of $S_i$ in register 21, as determined in the present event timing cycle, is added to the value $Si_{i-1}$ determined in the previous event timing cycle. The result of this addition is then transferred by gates 37 to register 38 and represents the count or time accumulated in counter 19 since that counter was last reset.

A comparator 39 is actuated by timing pulse 6 to compare the time in register 38 to a predetermined time X stored in a register 40. When the time in register 38 equals or exceeds X, comparator 39 provides an output pulse to AND gates 41 and 42. AND gate 41 also receives timing pulse 7 as an input signal and, when actuated, resets memory address counter 31 and event time counter 19. AND gate 42 also receives timing pulse 8 as an input signal and, when actuated, resets event counter 14. Thus, the system is reset after a predetermined time interval X has expired rather than after n events have been detected and counted. In this regard, it has been found that, in a speech recognition system, a value for X of approximately 17.3 ms is effective in providing a high degree of phoneme recognition accuracy. In addition, a value for q on the order of six or seven is highly advantageous and reduces the amount of stored data by sixfold or sevenfold, respectively. Further reductions can be effected by repeating the process described above using the determined A values in place of the measured times B between detected events.

As noted above, the count in event time counter 19 is cumulative throughout the data sequence of n detected events, rather than being reset after each detected event in the sequence. This approach facilitates summing of the individual data points $B_i$ in order to arrive at the sums $S_i$. More particularly, in the present exemplar embodiments, each data point $B_i$ in the n-data point sequence is the measured time between successive detected waveform events. It is possible to merely measure that time and then reset the count for each detected event, and that approach is certainly within the scope of the present invention. However, the process described herein requires the continuous summation of accumulated event times $B_i$. Accordingly, by keeping a running count of time in counter 19 throughout the entire data sequence of n events (or until time X has elapsed), processing is significantly simplified.

Figure 3:
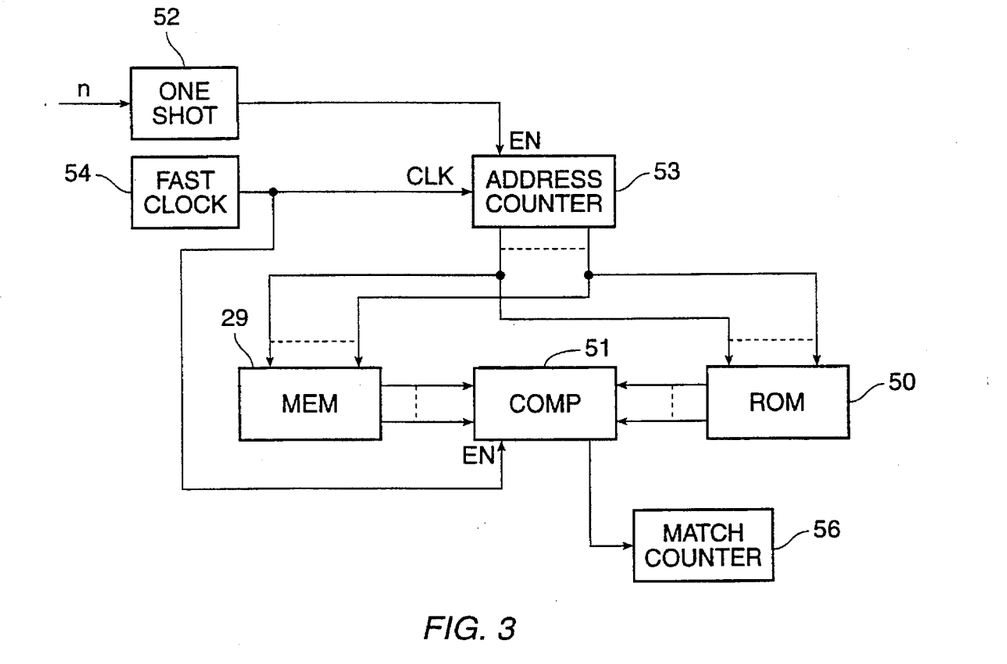
FIG. 3 is a block diagram of a circuit in accordance with the present invention for comparing data stored in the embodiments of FIGS. 1 or 2 to incoming data.

FIG. 3 illustrates an example of a circuit suitable for use with the system of FIG. 1 in order to effect a phoneme recognition function in a speech recognition system. Initially, before using the system to recognize speech, data for reference or standard speech is stored in a read only memory (ROM) 50 along with the identity of corresponding phonemes. Such standard or reference speech information may be independently determined, or a pre-existing database may be utilized, such as the "DARPA-TIMIT" database considered to be a standard in the speech recognition research field.

When utilizing ROM 50 with the system of FIG. 1, locations in ROM 50 are sequentially compared to corresponding locations in memory 29 at a comparator 51. L In particular, when the time event counter 14 in FIG. 1 reaches a count of n detected events, a one-shot multi-vibrator 52 is triggered and provides an enable pulse to a read address counter 53 for ROM 50 and memory 29. If the system of FIG. 2 is utilized, the output signal from comparator 39, rather than the event count, triggers one-shot multi-vibrator 52. In either case, a further fast clock pulse generator 54 is operative, for the duration of the enable pulse from one-shot multi-vibrator 52, to repetitively increment address counter 53. Fast clock pulses also sequentially enable comparator 51 to compare the numbers at the addressed locations of ROM 50 and memory 29. In this way, all of the values of A that have been determined since the previous enabling of the read address counter 53 are compared with the stored reference data to determine if a match has occurred. Matches are counted at match counter 56 and, if a predetermined number of matches is achieved, a phoneme is declared identified. The duration of the pulse from one-shot multi-vibrator 52 is sufficient to permit the fast clock 54 and counter 53 to address all of the stored memory and ROM locations.

Figure 4:
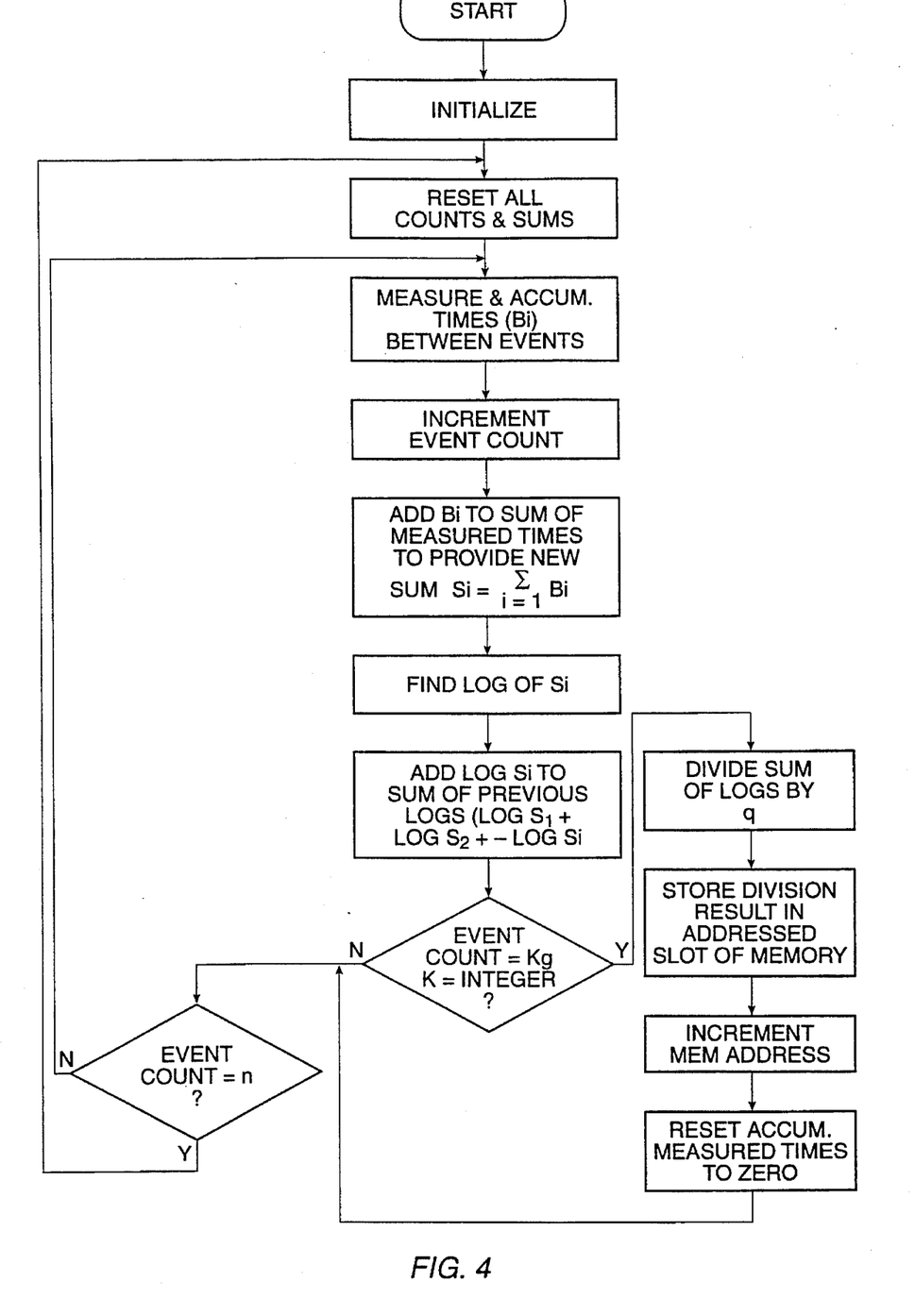
FIG. 4 is a flow chart of a first software embodiment of the present invention.
Figure 5:
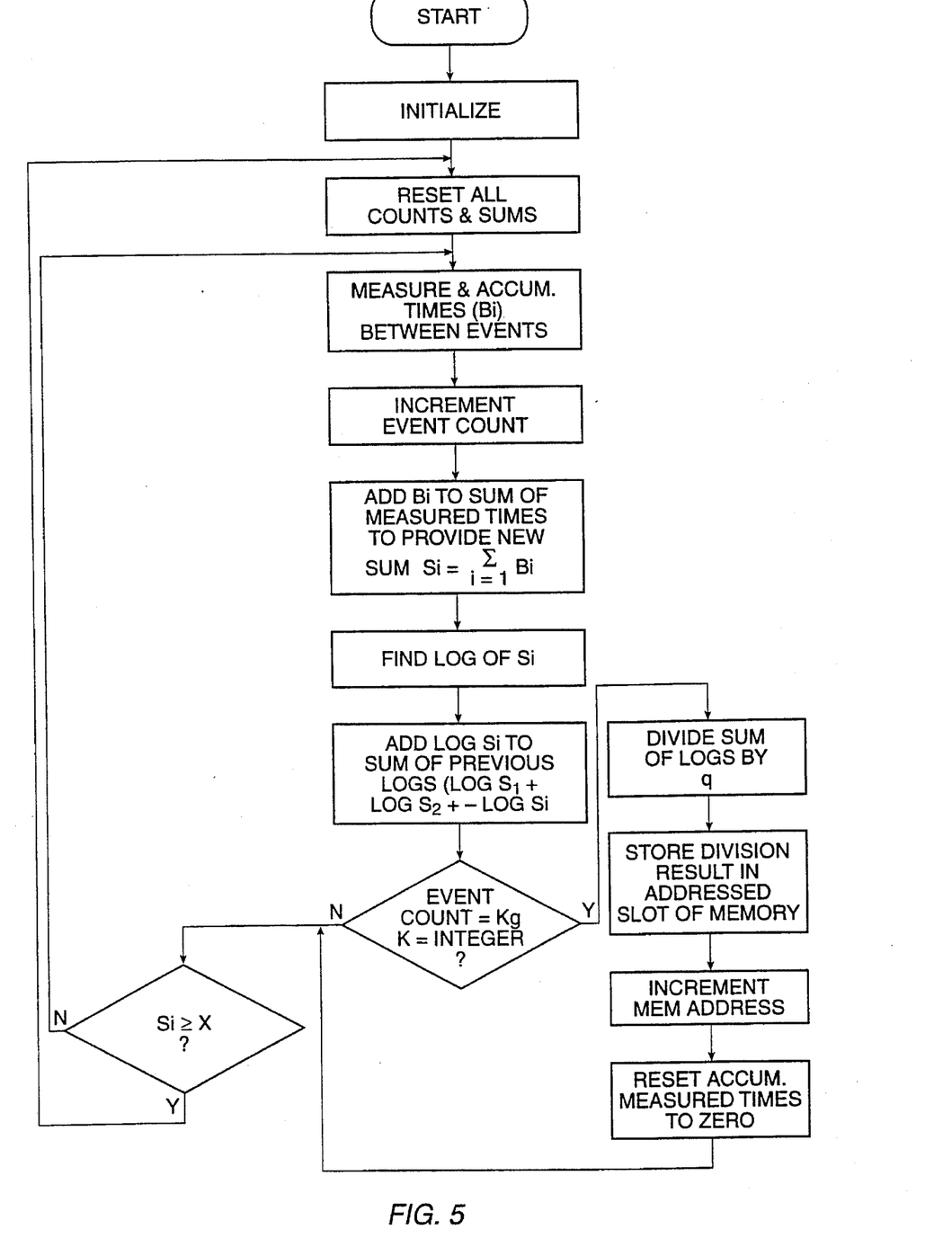
FIG. 5 is a flow chart of a second software embodiment of the present invention.

FIGS. 4 and 5 illustrate flowcharts for software embodiments of the present invention. Referring specifically to FIG. 4, after initialization of the system, all of the counts and sums are reset. Upon receipt of an input signal, waveform events are detected, the times $B_i$, etc. between events are measured and individually accumulated, and each detected event is counted. The sum $S_i$ of the accumulated event times is obtained and its logarithm computed. The logarithm of $S_i$ is then added to the previous logarithms of sums. If the event count is not some integral multiple of q, and has not yet reached n, the next time duration $B_i$ between events is measured and the above-described steps are repeated. If the event count is some integral multiple of q, the accumulated sums $LS_i$ of the logs are divided by q to obtain the encoded average A. Average A is stored in the addressed memory location, the memory address counter is then incremented, and the accumulated measured times are reset, before measuring the next time $B_i$ between events and repeating the processing steps. Once the event count reaches n events, all of the counts and sums are reset and a new data sequence is initiated.

The flowchart illustrated in FIG. 5 is similar to that of FIG. 4 except for determining the end of a data sequence. Specifically, when the value of $S_i$ reaches X, the counts and sums are reset and a new data sequence is begun. The present invention provides a technique for encoding long sequences of data in a manner to reduce processing and storage requirements while retaining a unique representation of the order and composition of the original sequence.

Having described a preferred embodiment of a new and improved Method and Apparatus for Encoding Sequences of Data in accordance with the present invention, it is believed that other modifications, variations and changes will be suggested to persons skilled in the art in view of the teachings set forth herein. Accordingly, it is to be understood that all such variations, modifications and changes are believed to fall within the scope of the present invention as defined by the appended claims.

What is claimed is:

1. In a speech compression system including an analog-to-digital converter, an electronic calculation unit, and an electronic memory device, a method for encoding an analog speech signal comprising the steps of:

(a) extracting, using the analog-to-digital converter and the electronic calculation unit, a first sequence of digital samples from said analog speech signal;

(b) summing, using the electronic calculation unit, each digital sample in the first sequence with the previous digital samples to obtain a cumulative sum sequence of sample point sums;

(c) determining, using the electronic calculation unit, the logarithm of each sample point sum in said sum sequence to obtain a sequence of logarithms;

(d) summing, using the electronic calculation unit, each logarithm with the previous logarithms in said sequence of logarithms to obtain a cumulative sequence of summed logarithms;

(e) obtaining, using the electronic calculation unit, a scaled average of the summed logarithms from step (d); and (f) storing the scaled average obtained in said (e) step in the electronic memory device; and wherein said scaled average represents said analog speech signal in compressed form.

2. The method of claim 1 further comprising the steps of:

(g) storing scaled averages representing standardized patterns;

(h) performing steps (a), (b), (c) and (d), (e) and (f) on an input analog speech signal to be recognized in order to yield an input scaled average; and (i) comparing the scaled non-linear average obtained in step (h) to the non-linear averages stored in said step (e) step to identify a match.

3. The method of claim 1 wherein said digital samples obtained in said (a) step are times of amplitude waveform events in said analog speech signal, said events corresponding to peaks in said analog speech signal.

4. The method of claim 1 wherein said digital samples obtained in said (a) step are times of amplitude waveform events in said analog speech signal, said events corresponding to zero crossings in said analog speech signal.

5. An encoder for encoding an analog speech signal, said encoder comprising:

means for transforming said analog speech signal into a sequence of digital samples;

a register for storing said digital samples in sequence;

means for summing said digital samples stored in said register to provide a cumulative sum sequence wherein each cumulative sum is the sum of a corresponding digital sample plus all preceding digital samples in said data sequence;

a logarithm circuit for determining the logarithm of each sum in said sum sequence to obtain a logarithm sequence;

an adder for summing said logarithm to provide a cumulative logarithm sum sequence, wherein each cumulative logarithm sum in said cumulative logarithm sum sequence is the sum of a corresponding logarithm plus all preceding logarithms in said logarithm sequence; and a divider for dividing the cumulative logarithm sums in said logarithm sequence by a predetermined factor to obtain an indicator representing said analog signal.

6. The encoder of claim 5 wherein said digital samples are times of amplitude waveform events in said analog speech signal, said events corresponding to peaks in said analog speech signal.

7. The encoder of claim 5 wherein said data points are times of amplitude waveform events in said analog speech signal, said events corresponding to zero crossings in said analog speech signal.

8. A speech recognition system comprising:

a conversion circuit for transforming an analog speech signal to be recognized into a series of sample sequences of digital samples, wherein each sequence corresponds to a predetermined time period of said analog speech signal;

a register for storing said sample sequences of said series;

a first summer for obtaining cumulative sum sequences corresponding to each sample sequence of said series, each cumulative sum sequence including a plurality of cumulative sums, each cumulative sum being the sum of a corresponding digital sample and previous digital samples in the corresponding sequence;

a logarithm circuit for obtaining logarithm sequences corresponding to said sum sequences; each logarithm sequence including logarithms of sums of the corresponding sum sequence;

a second summer for obtaining cumulative logarithm sum sequences corresponding to said logarithm sequences, each logarithm sequence including a plurality of cumulative logarithm sums, each cumulative logarithm sum being the sum of a corresponding logarithm and previous logarithms in the corresponding logarithm sequence; and an averaging circuit for obtaining a sequence of scaled averages, each scaled average being a scaled average of one of said cumulative logarithm sum sequences.

9. The speech recognition system of claim 8 further comprising:

an electronic memory device that stores a set of predetermined patterns; and a comparison circuit that compares said sequence of scaled averages to said predetermined patterns stored in said electronic memory device to identify a similar pattern.

10. The speech recognition system of claim 9 wherein said predetermined patterns correspond to speech phonemes.

* * * * *